N. T. HARRINGTON.
CLEARANCE TESTING INSTRUMENT.
APPLICATION FILED FEB. 7, 1919.
1,437,053.
Patented Nov. 28, 1922.
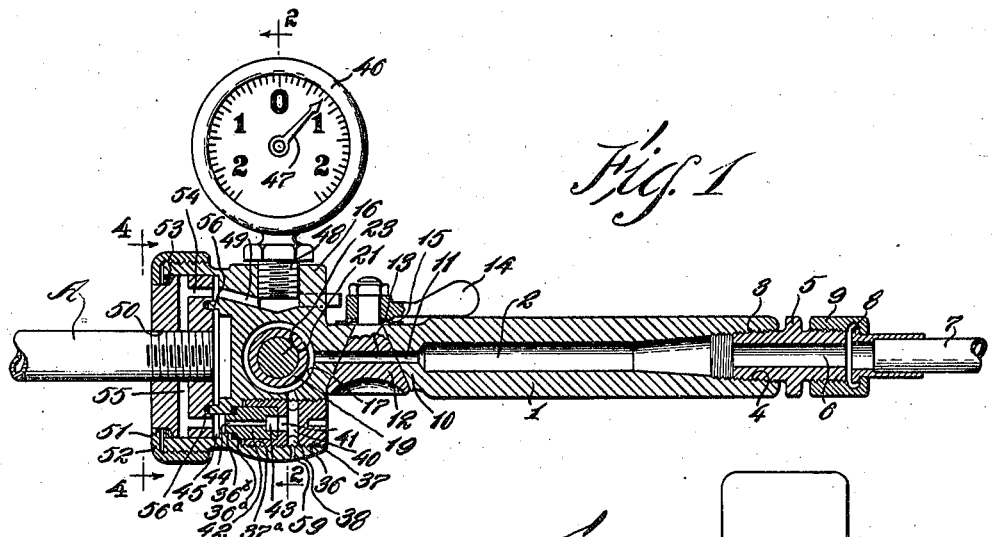
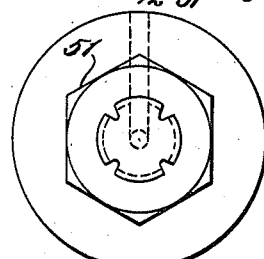
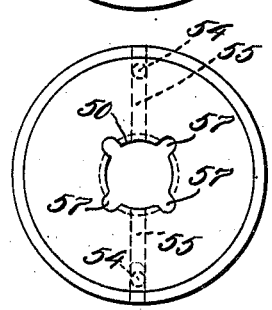
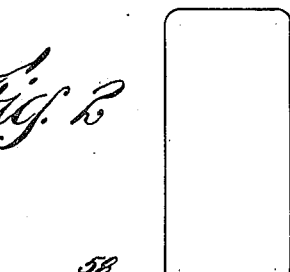
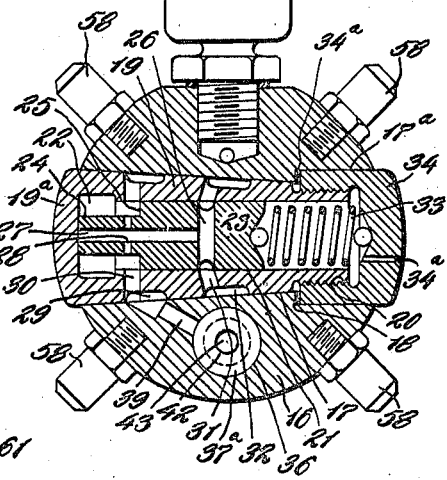
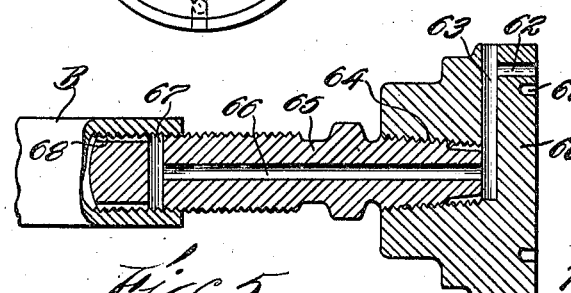

Patented Nov. 28, 1922.

1,437,053

UNITED STATES PATENT OFFICE.

NORMAN T. HARRINGTON, OF CLEVELAND, OHIO.

CLEARANCE-TESTING INSTRUMENT.

Application filed February 7, 1919. Serial No. 275,491.

*To all whom it may concern:*

Be it known that I, NORMAN T. HARRINGTON, a citizen of the United States, residing at Cleveland, in the county of Cuyahoga and State of Ohio, have invented a certain new and useful Improvement in Clearance-Testing Instruments, of which the following is a full, clear, and exact description, reference being had to the accompanying drawings.

This invention relates to gauges and has for its general object to provide an instrument of this character which will enable the amount of clearance between a given body and a cooperating body to be conveniently ascertained and indicated. While my invention possesses special utility in determining the clearance between cooperating threaded bodies or objects, it is not limited in its application to such bodies or objects. Further and more limited objects of the invention will appear hereinafter and will be realized in and through the combinations of elements embodied in the claims forming part hereof.

Referring to the use of my instrument in connection with threaded objects, it should be stated that, so far as I am advised, the general practice of determining the accuracy of such objects is to apply the same to a cooperating threaded standard gauge block and determine, by the closeness or looseness of the fit between the threads of the object and the gauge block (through the sense of feeling) the accuracy of the threading and the amount of clearance between the threads of the said object and those of the gauge block. If the threads of the object tested bind too tightly upon the threads of the gauge block, or if too much clearance between such threads is apparent, the object is discarded. Where my instrument and invention are employed in connection with a threaded object, it is possible to determine, by reference to a pressure indicator, whether the clearance between the threads of such object and those of the gauge block is within the limits of tolerance permitted or whether such tolerance limits have been exceeded, thus enabling the gauging of such objects to be effected with speed and accuracy.

In the drawings forming part hereof, I have shown my gauge as adapted for use with both internally and externally threaded objects.

In said drawings, Fig. 1 represents a central longitudinal sectional view through the instrument where used in connection with an externally threaded object, the pressure indicating device and an externally threaded object being shown in elevation; Fig. 2 a sectional view corresponding to the line 2—2 of Fig. 1, the pressure indicating device here also being shown in elevation; Fig. 3 an end elevation of the gauge, the pressure indicating device being omitted; Fig. 4 an end elevation of the standard or master gauge block employed with the instrument shown in the preceding views, the view corresponding to the line 4—4 of Fig. 1 and looking in the direction of the arrows; and Fig. 5 a central longitudinal sectional view through the standard or master plug employed with my gauge when the object to be tested is internally threaded, such object also being shown in section.

Describing by reference characters the various parts illustrated herein, and with particular reference to Figs. 1 to 4 inclusive, wherein the gauge is employed for the testing of externally threaded objects, 1 denotes a handle having a bore 2 therethrough. For convenience of description, the portion of the gauge which receives the object to be tested will be referred to as the "front" and the opposite portion as the "rear"; furthermore the instrument will be assumed to be operated in the positions shown in Figs. 1 and 2, and the words "top" and "bottom" and "upper" and "lower" will be employed accordingly. The rear end of the bore 2 is enlarged and tapered and provided with a thread, indicated at 3, said thread cooperating with an external thread 4 on a connection 5 having a bore 6 therethrough. A tube 7 is detachably secured to the connection 5, as by means of a shoulder 8 on the end of said tube and a shouldered or flanged nut 9 threaded onto the rear end of said connection.

Projecting forwardly from the handle 1 is a neck 10 having a bore 11 therethrough, said bore constituting a reduced extension of the bore 2. Mounted in the neck is a rotary valve 12 having a port 13 extending therethrough and adapted to register with the front and rear portions of the bore 11, the valve being provided with an operating handle 14. The valve is shown as tapered and the seat provided therefor in the neck is correspondingly tapered, a spring 15, surrounding the valve stem and interposed between the hub of the handle and the neck, serving to draw the valve to its seat.

At its front end, the neck 10 is shown as merging with a head 16, said head having a central tapered opening 17 therethrough. The lower end of the opening is shown as enlarged, as indicated at 17$^a$, thereby to provide an annular shoulder 18. The bore 17, 17$^a$ receives therewithin a pressure reducing valve comprising a tapered casing 19 closed at its enlarged upper end to provide a cap 19$^a$ and having its opposite end reduced and provided with an external thread 20. The casing 19 is provided with a cylindrical bore 21 extending from the reduced end thereof, the said bore being enlarged at the opposite or upper end of the casing, as indicated at 22, to provide a chamber at and within such end and beneath the cap 19$^a$.

Mounted in the bore 21, 22, is a reciprocable valve body, indicated generally at 23, said body being preferably cylindrical in shape throughout the major portion of its length to conform to and form a working fit with the bore 21. The upper end of the valve body within the chamber 22 and within the upper portion of the bore 21 adjacent thereto, is reduced in diameter, as indicated at 24, providing an annular ledge at 25. At a short distance above the center, the valve body is provided with a transverse port 26 extending through and across the central portion of said body. From the central portion of this port, the port 27 extends axially of the valve body through the upper end thereof. A pair of diametrically opposed ports 28 extend from the port 27 to the chamber surrounding the extension 24 and place the port 27 in communication with said chamber.

The casing 19 is provided with a wide annular channel 29 in its outer surface, the upper portion of said channel communicating with the chamber 22 by means of diametrically opposed ports 30. With the valve body in the position shown in Fig. 2, the port 26 communicates by means of diametrically opposed ports 31 in the casing 19 with the upper portion of a wider annular portion 32 in the outer surface thereof. The valve body is normally held with its upper end seated against the upper cap of the casing 19 by means of a coiled spring 33 bearing at one end against the bottom of the valve body and at its other end against a cap 34 which is threaded upon the lower end of said casing, there being a gasket of packing material 34$^a$ interposed between the top of the side wall of the cap and the shoulder 18.

At one side of the opening 17, the head 16 is provided with an internally threaded bore 36 extending from the rear end thereof. In front of the threaded portion thereof the bore is reduced, as shown at 36$^a$, and is still further reduced at its extreme front or discharge portion, as indicated at 36$^b$. Mounted in the threaded portion 36 of the bore is a plug 37 having a sleeve 37$^a$ at the front end thereof. The plug is shown as threaded throughout its entire external surface, with the exception of an annular recess 38, which communicates, by means of a port 39, with the annular recess 29. The plug is also provided with a transverse port 40 communicating with opposite ends of the recess 38 and with a short central port 41 communicating at its rear end with said throughport.

Mounted within the sleeve 37$^a$ and in the reduced portions 36$^a$ and 36$^b$ of the bore 36 is a flow reducing nipple or bead 42 having a central chamber 43 at the rear end thereof, communicating with the port 41, and a central calibrated restricted port 44 extending forwardly from said chamber and communicating at its front end with a chamber 45 provided within the head and at the rear of the gauge block 46.

Projecting from one side of the head is a pressure indicating gauge 46 having an indicator 47 and connected by the nipple 48 with the chamber 45 by means of a port 49.

A gauge block, shown in Figs. 1, 3 and 4, is employed for the testing of externally threaded objects. It comprises a body having a central internally threaded bore 50, the rear portion of said body being cylindrical to provide a close fit within a cylindrical seat provided therefor in the front of the head. The front of the gauge block is shown as reduced in diameter as compared with the rear portion and is angular in outline— see 51—to receive a flanged internally threaded skirt 52 whereby the block may be secured within the front of the head, suitable packing 53 being interposed between the flange and the block and, if desired, between the flange and the front sleeved portion of the head, thereby to prevent leakage of pressure fluid from the ports in the gauge block.

54 denotes ports extending forwardly from the rear of the gauge block, on opposite sides of the central portion thereof, the front ends of said ports communicating each in turn with a port 55 extending inwardly to the threaded bore of the block. The block may be provided with an annular recess in the rear face thereof, adapted to receive an annular rib 56 carried by the head, thereby to prevent leakage from the chamber 45. Packing 56$^a$ is interposed between said rib and said recess. The bore 50 is provided with grooves 57 extending longitudinally from the front to the rear thereof. Four such grooves are shown each being angularly spaced from the ports 55. The grooves provide venting ports, and these venting ports are shown as spaced about 90 degrees apart; the centers of the receiving ends of the venting ports are preferably spaced about twice the width of the ports 55 from the centers of the delivery ends of the latter. If desired, the head 36 may be provided with suitable supporting studs or feet 58.

With the parts arranged and constructed as described the instrument will be operated in the following manner: An externally threaded object to be tested, such as A, will be screwed into the bore 50. Air or other pressure fluid will be admitted through the pipe 7, handle 1 and valve 12 to the annular recess 32, whence it will pass, by ports 31, 26, 27, and 28 into the chamber 22 and thence by the ports 30, annular recess 29, port 39, and annular recess 38 and port 40 and chambers 41, and 43, to the restricted bore or port 44 of the nipple or bead 42. By means of the vent port 59 communicating with the recess 38, any moisture or other foreign matter in the pressure fluid will be blown out, the venting port being of such small cross-sectional area as to exert no appreciable effect upon the pressure of the fluid in the chambers 41 and 43. The fluid, thus reduced in pressure by the valve 23, enters the chamber 45 and passes through the ports 54 and 55 to the space between the threaded object A being tested and the threaded portion of the gauge block corresponding to the width of the last mentioned ports. The amount of leakage between the object tested and the gauge block will indicate, through the pressure gauge 48, the clearance between such threads. Pressure within the chamber 22 will move the body 23 downwardly, thereby cutting down or cutting off the supply of pressure fluid through the recess 32 and ports 31, 26, and 27 and delivering the fluid at a predetermined pressure to the chambers 41 and 43 and to the bead 42. The bead serves to restrict the rate of flow of the pressure fluid from the chambers 41 and 43 to the chamber 45 and to the space between the instrument and the object tested. With the clearance or leakage area between the gauge block and the article tested equal to the area of the port 44, the pressure of the fluid supplied to said block by the bead 42 will be about half that which exists in the chambers 41 and 43. This reduction of pressure makes it possible to calibrate the gauge 46 to indicate clearly small variations in pressure due to the testing of successive objects. For instance, with a maximum pressure of five pounds in the chamber 45, the gauge 46 can be calibrated to indicate variations of less than one-thousandth inch between the diameters of the objects tested and that of the bore of the gauge block.

The provision of the ports 26 and 28 and the annular recesses 29 and 32 enables me to balance the pressure on opposite sides of the valve body 23, thus preventing the body from binding within its casing. In like manner, the provision of the ports 54 and 55 enables me to balance the pressure on opposite sides of the article tested and thus ensures the centering of such object with respect to the gauge block.

The venting port 34ª in the cap 34 permits moisture and leakage past the valve 23 to escape and also serves to steady the action of the valve, preventing fluttering thereof.

In practice, two externally threaded plugs may be employed in connection with objects of the same kind. One of these standard gauge plugs will be so threaded as to provide a substantially perfect fit with the bore of the gauge block, giving a minimum of clearance; the other will be threaded so as to fit more loosely within the bore of the gauge block and provide therewith the maximum clearance permissible. Each of these plugs will be applied to the gauge block, the pressure fluid turned on, and the gauge 46 read. Any object to be tested showing a pressure indication within these two limits indicated by the gauge 46 will be acceptable.

An important advantage of my invention resides in the fact that the gauge block need not be renewed frequently by reason of the wearing of the threads. This wearing of the threads will affect the readings in connection with the standard plugs equally with the readings of the tested objects. It is necessary, therefore, only to take the reading of the standard plugs from time to time and see that the readings of the tested objects or plugs come within the limits obtained by such readings.

In Fig. 5 I have shown the form of gauge block employed where the articles tested are internally threaded. The gauge block is shown as adapted to be employed interchangeably with that shown in Figs. 1 to 4 inclusive. The gauge block in this case comprises the body 60 having in the rear face thereof the annular groove 61 corresponding to the groove 56 and a port 62 extending from the rear face and adapted to communicate with the chamber 45 through a radial port 63 extending to the rear of a central internally threaded bore 64 which receives the externally threaded rear end of a gauge block plug 65. This plug is provided with an axial port 66 communicating with the port 63 at its rear end and at its front end with the transverse through-port 67. The front of the plug 65 is externally threaded to receive an internally threaded object B to be tested and is provided in its external surface with venting recesses or grooves 68 extending longitudinally thereof from the port 67. These ports serve the same purpose as the ports 57; that is to say, the pressure fluid admitted to the space between the threads of the externally and internally threaded objects will flow between the threads thereof as far as said ports and will then be vented thereby to the atmosphere.

As a basis for comparison, two standard internally threaded members will be employed, one of said members providing with the plug 65 the maximum permissible clearance and the other the theoretical minimum clearance characterizing a perfect thread in the tested object.

By making the bead or nipple 42 removable, I am enabled to adapt the instrument to the particular grade of inspection-accuracy required, this result being accomplished by using a bead or nipple having a small bore where great accuracy is required and one having a larger bore where a less degree of accuracy is required.

The instrument shown herein is a self-contained device embodying means for regulating the pressure of a fluid, means for reducing the rate of flow of the fluid the pressure whereof has been so regulated, and for delivering the fluid the rate of flow whereof has been so reduced to a space or joint between the instrument and the object to be tested, with means for indicating the pressure, or leakage, of such fluid at such joint or at or through the space being tested.

While I have shown my invention in detail and have illustrated and described the same in connection with threaded objects, it will be apparent that, within the scope of my invention, these details may be varied without departing from the spirit of the invention and that the instrument affords a means for testing the clearance between objects other than those provided with threads, as well as the leakage through any space to which it may be applied.

Having thus described my invention, what I claim is:—

1. A testing gauge having a portion adapted to receive an object to be tested, said portion being provided with exhaust ports, means for conducting fluid under pressure to said portion, and a device for indicating the leakage of such fluid between the object tested and said exhaust ports.

2. In an instrument of the character described, the combination of a gauge block having a surface provided with exhaust ports and adapted to cooperate with the complementary surface of an object to be tested, means for conducting fluid under pressure to the space between said surfaces, and a device for indicating the leakage of such fluid between such space and exhaust ports.

3. An instrument of the character described having a portion for application to an object to be tested, a part provided with a conduit for fluid under pressure leading to said portion, a device for regulating the pressure of the fluid conducted through said conduit, a device for reducing the rate of flow of the fluid delivered from the first mentioned device to said portion, and means for indicating the pressure of the fluid in said portion.

4. In an instrument of the character described having a portion for application to an object to be tested, a part provided with a conduit for fluid under pressure leading to said portion, a device for regulating the pressure of the fluid conducted through said conduit, means for reducing the rate of flow of the fluid delivered from the pressure reducing device to said portion, and means for indicating the pressure of the fluid in said portion.

5. An instrument of the character described having a portion adapted for application to an object to be tested, a part provided with a conduit for fluid under pressure leading to said portion, a pressure regulating device in said conduit, a chamber in said conduit and to which the fluid delivered from said device is conducted, a bead in said conduit having a restricted port and receiving the fluid delivered from said chamber, and means for indicating the pressure of the fluid in said portion.

6. An instrument of the character described having a portion adapted to cooperate with a surface of an object to be tested and a part provided with a conduit for fluid under pressure extending to such portion, an automatic pressure regulating valve in said conduit, a chamber in said conduit to which the fluid delivered from said valve is conducted, said chamber having a venting port, a bead in said conduit having a restricted port through which the fluid from said chamber is conducted, the aforesaid portion of said instrument being located beyond said bead, and a device for indicating the rate of leakage of the pressure fluid through or across the surface of the object to be tested.

7. An instrument of the character described having a portion adapted to cooperate with an object to be tested and a part provided with a conduit for fluid under pressure extending to such portion, an automatic pressure regulating device in said conduit, a chamber in said conduit to which the fluid delivered from said device is conducted, said conduit having a restricted bore through which the fluid from said chamber is conducted the aforesaid portion of said instrument being located beyond said bore, and a device for indicating the rate of leakage of the pressure fluid through or across the surface to be tested.

8. In an instrument of the character described, the combination of a gauge block having a surface adapted to cooperate with the complementary surface of an object to be tested, and to provide a space therebetween, means for delivering fluid under pressure to a plurality of points between such surfaces, and a pressure indicating device operatively connected with said means.

9. In an instrument of the character described, the combination of a gauge block having a portion adapted to cooperate with an object to be tested, a pressure fluid conduit in said instrument for conducting fluid under pressure to said portion, means associated with said instrument for regulating the pressure of such fluid, means for reducing the rate of flow of the fluid delivered from the regulating means and for supplying the same to the said portion, and a fluid pressure gauge operatively interposed between such pressure reducing means and said portion.

10. In an instrument of the character described, the combination of a gauge block having a portion adapted to cooperate with an object to be tested, means for supplying fluid under pressure to said portion, means for regulating the pressure of such fluid, means for restricting the flow of the fluid from such regulating means to said portion, and means for indicating the pressure of the fluid in said portion.

11. In an instrument of the character described, the combination of a gauge block having a surface adapted to cooperate with the complementary surface of an object to be tested, said block having ports adapted to communicate with angularly spaced portions of the space between said surfaces and one or more venting ports adapted to communicate with the space between said surfaces, means for delivering fluid under pressure through the first mentioned ports, and a fluid pressure indicating device operatively connected with the space between said surfaces to which the pressure fluid is delivered.

12. In an instrument of the character described, the combination of a head, a gauge block detachably connected to said head and having a surface adapted to cooperate with the complementary surface of an object to be tested, said block having ports adapted to communicate with angularly spaced portions of the space between said surfaces, means for supplying to said head fluid under pressure, means associated with said head for reducing the pressure of the fluid delivered therefrom to said ports, and a pressure indicating device operatively connected with the space between said surfaces, said block having a plurality of venting ports communicating with said space, said venting ports being spaced apart in a plane extending transversely of said block.

13. In an instrument of the character described, the combination of a gauge block having a surface adapted to cooperate with the complementary surface of an object to be tested, said block having ports communicating with angularly spaced portions of the space between said surfaces, means for supplying fluid under pressure to said ports and a pressure indicating device operatively connected with the space between said surfaces, said blocks having a plurality of venting ports communicating with said space, said venting ports being spaced apart in a plane extending transversely of said block.

14. A gauge block having a threaded surface adapted to cooperate with the threaded surface of an object to be tested, said gauge block having one or more ports for delivering fluid under pressure to one or more portions of its threaded surface and one or more venting ports in the threaded surface of such block, the venting port or ports extending longitudinally of such surface and across the threads thereof and angularly spaced from the first mentioned port or ports, and means for supplying fluid under pressure to said port or ports.

15. A gauge block having a threaded surface adapted to cooperate with the threaded surface of an object to be tested, said gauge block having one or more ports for delivering fluid under pressure to one or more portions of its threaded surface and one or more venting ports in the threaded surface of such block and extending longitudinally thereof and across the portion of such surface to which the pressure fluid is delivered, and means for supplying fluid under pressure to said port or ports.

16. A gauge block having a threaded surface provided with exhaust ports and adapted to cooperate with the complementary threaded surface of an object to be tested, means associated with said block for delivering fluid under pressure to a portion of its threaded surface, and means for indicating the leakage of said fluid between said threads and exhaust ports.

17. A gauge block having a threaded surface adapted to cooperate with the complementary threaded surface of an object to be tested and provided with a plurality of angularly disposed ports for conducting fluid under pressure to corresponding angularly spaced portions of its threaded surface, and means for supplying fluid under pressure to said ports.

18. A gauge block having a threaded surface adapted to cooperate with the complementary threaded surface of an object to be tested and provided with a port for conducting fluid under pressure to a portion of its threaded surface and with a venting port extending transversely of the threads of such surface and angularly spaced from the first mentioned port, and means for supplying fluid under pressure to the first mentioned port.

19. A gauge block having a threaded surface adapted to cooperate with the complementary threaded surface of an object to be tested and provided with a plurality of angularly spaced ports communicating with corresponding angularly spaced portions of its threaded surface and with a venting port extending longitudinally of such threaded surface and transversely of the thread thereof, and angularly spaced from said first mentioned ports, and means for supplying fluid under pressure to the first mentioned ports.

20. A gauge block having a surface adapted to cooperate with the complementary surface of an object to be tested and provided with a plurality of angularly disposed ports for conducting fluid under pressure to corresponding angularly spaced portions of the first mentioned surface, and means for supplying fluid under pressure to said ports.

21. A gauge block having a surface adapted to cooperate with the complementary surface of an object to be tested and provided with a port for conducting fluid under pressure, to a portion of the first mentioned surface and with a venting port in such surface and angularly spaced from the first mentioned port, and means for supplying fluid under pressure to the first mentioned port.

22. A gauge block having a surface adapted to cooperate with the complementary surface of an object to be tested and provided with a plurality of angularly disposed ports communicating with corresponding angularly spaced portions of the first mentioned surface and with a venting port extending longitudinally of the first mentioned surface and angularly spaced from said first mentioned ports, and means for supplying fluid under pressure to the first mentioned ports.

23. In an instrument of the character described, the combination of a gauge block having a surface adapted to cooperate with the complementary surface of an object to be tested and provided with one or more ports in said block adapted to communicate with a corresponding portion or portions of the space between said surfaces, said block having a conduit for conducting fluid pressure to said port or ports, said conduit having therein a removable pressure reducing bead or nipple having a restricted bore therethrough, and a pressure indicating device operatively connected with the said port or ports.

24. In an instrument of the character described, the combination of a head, a gauge block detachably connected to said head and having a surface adapted to cooperate with the complementary surface of an object to be tested, said head having one or more ports adapted to communicate with a corresponding portion or portions of the space between said surfaces, means for supplying pressure fluid to said head, said instrument having a conduit for conducting such fluid from said head to said port or ports, said conduit having therein a removable pressure reducing bead or nipple having a restricted bore therethrough, a blow-out port communicating with said conduit on the inlet side of said bore, and a pressure indicating device operatively connected with the first mentioned port or ports.

25. In an instrument of the character described, the combination of a head, a gauge block detachably connected to said head and having a surface adapted to cooperate with the complementary surface of an object to be tested, said head having one or more ports adapted to communicate with a corresponding portion or portions of the space between said surfaces, an automatic pressure regulating device in said head to which pressure fluid is delivered, said instrument having a conduit extending from said device to the port or ports in said block, a pressure reducing bead or nipple in said conduit and having a restricted port therethrough, a chamber in said conduit at the inlet end of said bead or nipple, a blow-out port communicating with said chamber, and a pressure indicating device operatively connected with the first mentioned port or ports.

26. In an instrument of the character described, the combination of a head, a gauge block detachably connected to said head and having a surface adapted to cooperate with the complementary surface of an object to be tested, said head having one or more ports adapted to communicate with a corresponding portion or portions of the space between said surfaces, means for supplying fluid under pressure to said head, an automatic pressure regulating device in said head to which the fluid is delivered, said head having a conduit communicating with the pressure regulating device and with said port or ports, said conduit having an internally threaded chamber therein, a plug threaded into said chamber and having a chamber to which the fluid is conducted from the regulating device, a nipple or bead supported in said conduit by said block and having a port therethrough communicating at its inlet end with said through port, and a gauge operatively connected with the first mentioned port or ports.

27. In an instrument of the character described, the combination of a head, a gauge block detachably connected to said head and having a surface adapted to cooperate with the complementary surface of an object to be tested, said head having one or more ports adapted to communicate with a corresponding portion or portions of the space between said surfaces, means for supplying fluid under pressure to said head, an automatic pressure regulating device in said head to which the fluid is delivered, said device comprising a reciprocable valve body in said head, a cap having a venting port, a spring interposed between said cap and said valve body, said instrument having a conduit communicating with the pressure regulating device and with said port or ports, means for reducing the rate of flow of the fluid in said conduit, and a gauge operatively connected with the first mentioned port or ports.

In testimony whereof I hereunto affix my signature.

NORMAN T. HARRINGTON.